US009694781B2

(12) United States Patent
Kwak et al.

(10) Patent No.: US 9,694,781 B2
(45) Date of Patent: Jul. 4, 2017

(54) METHOD OF PREPARING AN AIRBAG CUSHION BY MEANS OF SEWING

(71) Applicant: Kolon Industries, Inc., Gwacheon-si (KR)

(72) Inventors: Dong-Jin Kwak, Gumi-si (KR);
Ki-Jeong Kim, Daegu (KR);
Jae-Hyung Kim, Gumi-si (KR);
Hee-Jun Kim, Daegu (KR);
Jung-Hoon Youn, Gumi-si (KR);
Sang-Mok Lee, Gumi-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 260 days.

(21) Appl. No.: 14/468,481

(22) Filed: Aug. 26, 2014

(65) Prior Publication Data
US 2015/0000576 A1 Jan. 1, 2015

Related U.S. Application Data

(62) Division of application No. 13/515,098, filed as application No. PCT/KR2010/009586 on Dec. 30, 2010, now Pat. No. 8,851,516.

(30) Foreign Application Priority Data

Dec. 30, 2009 (KR) .................. 10-2009-0134475
Mar. 26, 2010 (KR) .................. 10-2010-0027417

(51) Int. Cl.
*B60R 21/231* (2011.01)
*B60R 21/235* (2006.01)
(Continued)

(52) U.S. Cl.
CPC .......... *B60R 21/231* (2013.01); *B60R 21/235* (2013.01); *D05B 1/00* (2013.01);
(Continued)

(58) Field of Classification Search
CPC ........ B60R 2021/23538; B60R 21/231; B60R 21/235; D05B 13/00; D05B 1/00; D05B 27/22; Y10T 442/2139
(Continued)

(56) References Cited

U.S. PATENT DOCUMENTS 3,785,308 A * 1/1974 Brandriff ............... B65H 59/36
112/278
8,960,714 B2 * 2/2015 Kim .................. B60R 21/23138
280/730.2

(Continued)

FOREIGN PATENT DOCUMENTS

CN 200961191 10/2007
CN 101372796 2/2009
(Continued)

OTHER PUBLICATIONS

European Patent Office, Extended European Search Report of the corresponding European Patent Application No. 10841318.8 (Jun. 18, 2013).

*Primary Examiner* — Arti Singh-Pandey
(74) *Attorney, Agent, or Firm* — Lex IP Meister, PLLC (57) ABSTRACT

The present invention relates to an airbag cushion and an airbag system including the same, and particularly to an airbag cushion, including: at least one fabric; and seam parts connecting the fabric, wherein deviation of upper seam thread length per a unit length of the fabric between the first seam part sewed in forward direction and the second seam part sewed in reverse direction in the seam parts is 15% or less, a method of preparing the same, and an airbag system including the same. The airbag cushion of the present invention is superior in working stability and unfolding performance because of the optimized properties of the seam parts, provides superior shape stability and air-tight effect at the same time, and can protect a passenger by minimizing the shock given to the passenger.

3 Claims, 6 Drawing Sheets

(51) Int. Cl.
 *D05B 1/00* (2006.01)
 *D05B 13/00* (2006.01)
 *D05B 27/22* (2006.01)

(52) U.S. Cl.
 CPC .... *D05B 13/00* (2013.01); *B60R 2021/23538* (2013.01); *D05B 27/22* (2013.01); *Y10T 442/2139* (2015.04)

(58) Field of Classification Search
 USPC ............. 112/154, 254, 475.08, 475.17
 See application file for complete search history.

(56) References Cited

U.S. PATENT DOCUMENTS

2007/0262575 A1  11/2007  Kobayashi
2011/0012331 A1* 1/2011  Kim ................. B60R 21/232
                                      280/730.2

FOREIGN PATENT DOCUMENTS

| | | |
|---|---|---|
| CN | 101377038 | 3/2009 |
| EP | 1033292 | 9/2000 |
| JP | 2002-255005 | 9/2002 |
| JP | 2007-302151 | 11/2007 |
| JP | 2009-050638 | 3/2009 |
| JP | 2009-119831 | 6/2009 |
| KR | 10-1999-0023333 | 3/1999 |
| KR | 10-2008-0078452 | 8/2008 |
| KR | 2008-0078452 | 8/2008 |
| KR | 10-2009-0070970 | 7/2009 |
| KR | 2009-0072244 | 7/2009 |
| KR | 10-2009-0102707 | 9/2009 |
| KR | 10-2009-0104537 | 10/2009 |
| WO | 2009/084873 | 7/2009 |
| WO | 2009/120025 | 10/2009 |

* cited by examiner

METHOD OF PREPARING AN AIRBAG CUSHION BY MEANS OF SEWING

CROSS-REFERENCES TO RELATED APPLICATION

This application is a Divisional application of U.S. patent application Ser. No. 13/515,098 filed Jun. 11, 2012, which is a National Stage application of PCT/KR2010/009586 filed on Dec. 30, 2010, which claims priority to Korean Patent Application No. 10-2009-0134475 filed on Dec. 30, 2009 and Korean Patent Application No. 10-2010-0027417 filed on Mar. 26, 2010, the contents of which are incorporated herein by reference.

BACKGROUND OF THE INVENTION (a) Field of the Invention

The present invention relates to an airbag cushion and an airbag system including the same, and particularly to an airbag cushion having a superior working stability and unfolding performance owing to the optimized property of seam part, a method of preparing the same, a sewing machine which can be used for such method, and an airbag system including the same.

(b) Description of the Related Art

Figure 1:
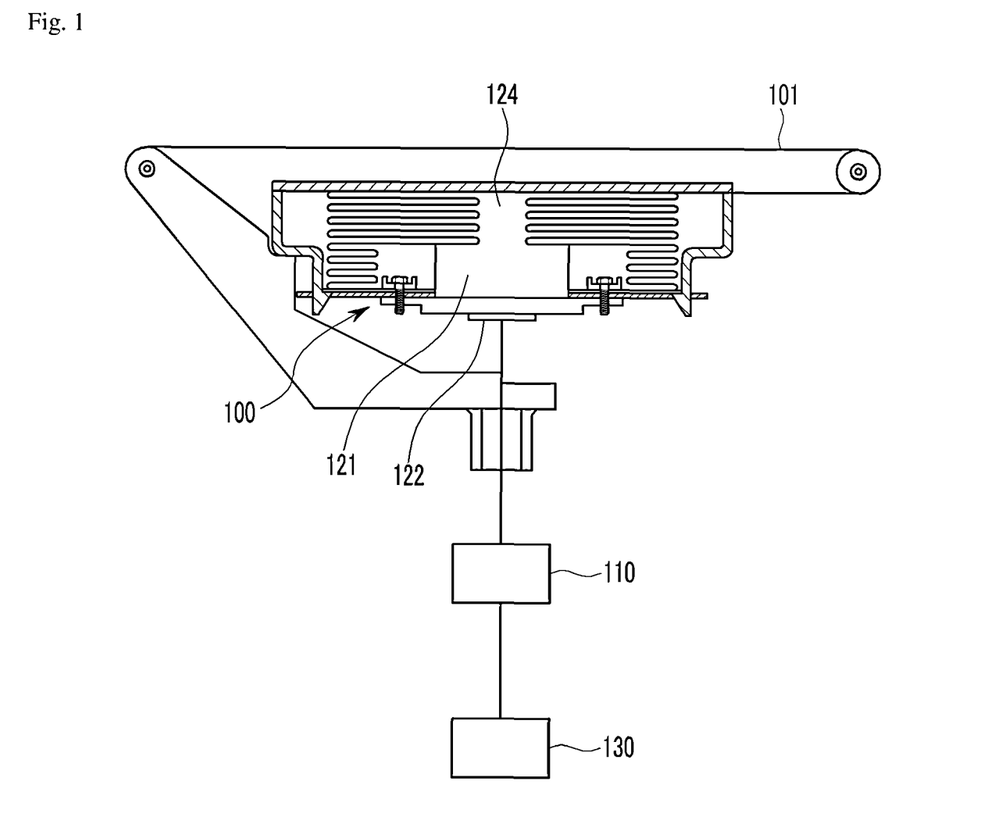
FIG. 1 is a drawing showing a conventional airbag system.

Generally, airbag is an apparatus for protecting a driver and passengers by providing a gas into the airbag by exploding gunpowder so as to inflate the airbag after detecting crash impact with an impact detecting sensor, when a driving car collides head-on at the speed of about 40 km/h or more, and a structure of a conventional airbag system is depicted in FIG. 1.

As depicted in FIG. 1, conventional airbag system includes an inflator 121 that generates a gas by ignition of a detonator 122; an airbag module 100 installed in a steering wheel 101 and including an airbag 124 that is expanded and unfolded toward a d for connecting the fabrics river on driver's seat by the generated gas; an impact sensor 130 that gives an impact signal when the car is crashed; and an Electronic Control Module (ECM) 110 that ignites the detonator 122 of the inflator 121 according to the impact signal. In the airbag system, the impact sensor 130 detects the impact and gives the signal to the ECM, when the car collides head-on. At this time, the ECM 110 that received the signal ignites the detonator 122 and a gas generator in the inflator 121 is combusted. The combusted gas generator generates the gas rapidly and expands the airbag 124. The expanded airbag 124 contacts to the front upper body of the driver and absorbs the impact load caused by the collision partially, and when the driver's head and chest go forward according to the law of inertia and smash against the airbag 124, it further absorbs the shock toward the driver by rapidly discharging the gas from the airbag through discharging holes formed on the airbag. Therefore, the airbag absorbs the shock effectively that is delivered to the driver, and can reduce the secondary injury at the time of a head-on collision.

As disclosed above, the airbag for car is prepared into a certain shape and installed in a steering wheel, side glass windows, or side pillars of the car in a folded form so as to minimize the volume, and it is expanded and unfolded when the inflator 121 operates.

At this time, a sewed airbag generally includes fabric, and seam parts for connecting the fabric. Namely, since the parts discharging air when the airbag is unfolded are the seam parts, the properties such as seam strength and elongation of the seam parts are important. Particularly, the connection performance of whole parts of the airbag must be maintained effectively so that superior expansion performance and unfolding performance are exhibited when the airbag is unfolded by instant gas generation.

However, the sewed airbag made by a common automatic sewing machine is short of the seam strength and elongation of the seam parts for providing effective expansion performance and unfolding performance when the airbag operates. The problem cannot be sufficiently overcome by changing the seam thread material applied to the seam parts, and thus the development of technology which can optimize the properties of seam parts without changing the material is required.

Therefore, the investigation for developing the airbag cushion including seam parts having superior mechanical properties and air-seal effect so as to exhibit excellent expansion and unfolding performance when the airbag is unfolded.

SUMMARY OF THE INVENTION

It is an aspect of the present invention to provide an airbag cushion superior in an air-seal property and an internal pressure maintenance by optimizing the properties of seam parts.

It is another aspect of the present invention to provide a method of preparing an airbag cushion, controlling the tension of seam thread to be in an optimum range.

It is still another aspect of the present invention to provide a sewing machine for the airbag cushion which can form seam parts of the airbag cushion superior in air-seal property and internal pressure maintenance.

It is still another aspect of the present invention to provide an airbag system including the airbag cushion.

DETAILED DESCRIPTION OF THE EMBODIMENTS

The present invention provides an airbag cushion, including: at least one fabric; and seam parts connecting the fabric, wherein deviation of upper seam thread length per a unit length of the fabric between the first seam part sewed in forward direction and the second seam part sewed in reverse direction in the seam parts is 15% or less.

The present invention also provides a method of preparing an airbag cushion, including the steps of: cutting at least one fabric; and sewing the fabrics so as to connect each other, wherein the sewing step is controlled so that tension of upper seam thread when sewing in reverse direction is 105% to 140% compared to tension of upper seam thread when sewing in forward direction.

The present invention also provides a sewing machine for an airbag cushion, equipped with a needle for sewing fabrics, and a main thread controller providing tension to an upper seam thread and a sub thread controller providing a preliminary tension to the upper seam thread provided to the main thread controller in the path of the upper seam thread from a thread supplying source to the needle; and further including a control means for minutely controlling the preliminary tension according to the sub thread controller.

The present invention also provides an airbag system including the airbag cushion.

Hereinafter, an airbag cushion according to specific embodiment, a method of preparing the same, a sewing machine for an airbag cushion which can be used for the method, and an airbag system including the same are explained in more detail. However, the followings are only for the understanding of the present invention and the scope of the present invention is not limited to or by them, and it is obvious to a person skilled in the related art that the embodiments can be variously modified in the scope of the present invention.

In addition, "include" or "comprise" means to include any components (or ingredients) without particular limitation unless there is no particular mention about them in this description, and it cannot be interpreted as a meaning of excluding an addition of other components (or ingredients).

The present invention can improve seam strength and elongation of seam parts so as to exhibit superior unfolding property when the airbag is expanded, and can secure excellent internal pressure maintenance, by applying an optimized sewing condition and sewing method for connecting the fabrics to the seam parts when preparing the airbag cushion.

Figure 2:
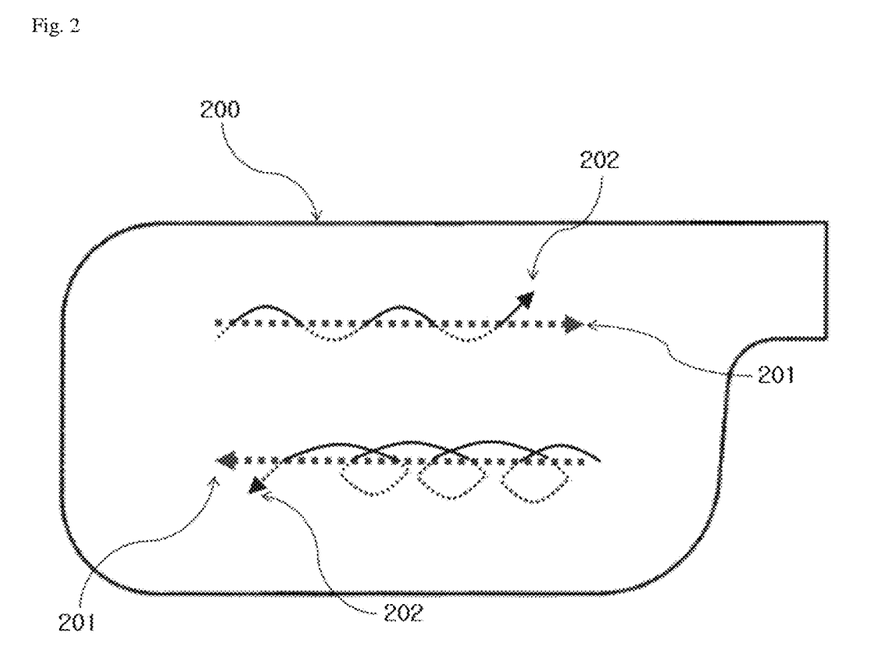
FIG. 2 is a schematic drawing showing the first seam part sewed in the forward direction and the second seam part sewed in the reverse direction, in the airbag cushion according to one embodiment of the present invention.

Generally, an airbag cushion is prepared by sewing and connecting fabrics so as to define expanding parts when an inflator is exploded. More concretely, in a common method of preparing an airbag cushion by sewing fabrics for an airbag with an automatic sewing machine, a lower thread 201 and an upper thread 202 are used on a fabric 200, and the sewing process is carried out by providing the upper thread 202 from the sewing machine in a certain direction against the lower thread 201, as shown in FIG. 2. At this time, the fabric 200 is fixed, and the sewing process is carried out by moving a needle of the sewing machine while changing its direction and providing the upper thread 202 in the same direction as the needle.

Therefore, the direction of providing the upper thread to the fabric may be changed even in sewing the fabrics composing one airbag cushion, and thus the direction of providing the upper thread 202 against the lower thread 201 may be also changed (see FIG. 2).

Figure 3:
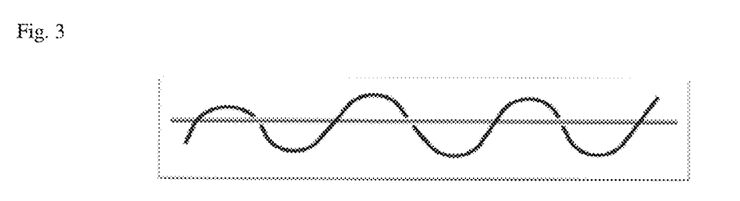
FIG. 3 is a schematic drawing showing the structure of the upper thread and the lower thread of the first seam part sewed in the forward direction, in the airbag cushion according to one embodiment of the present invention.
Figure 4:
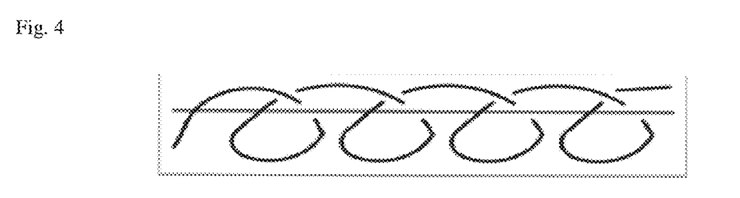
FIG. 4 is a schematic drawing showing the structure of the upper thread and the lower thread of the second seam part sewed in the reverse direction, in the airbag cushion according to one embodiment of the present invention.
Figure 5:
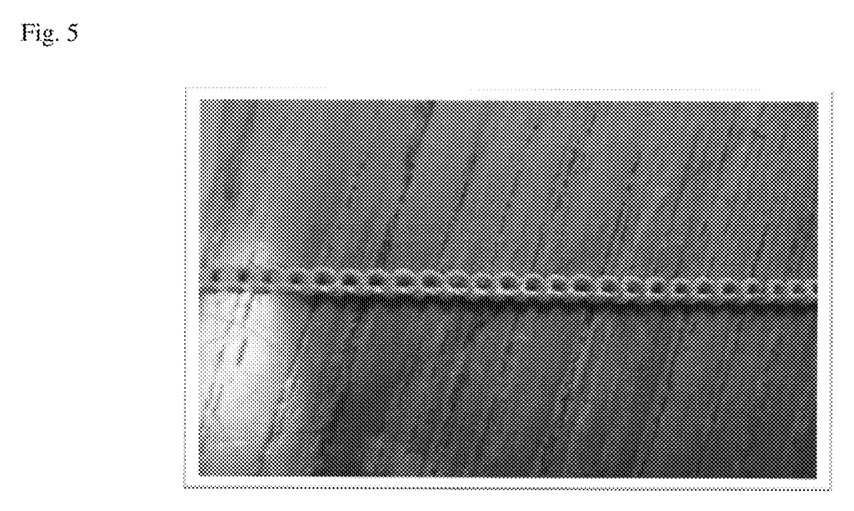
FIG. 5 is a photograph showing the structure of the upper thread and the lower thread of the first seam part sewed in the forward direction, in the airbag cushion according to one embodiment of the present invention.
Figure 6:
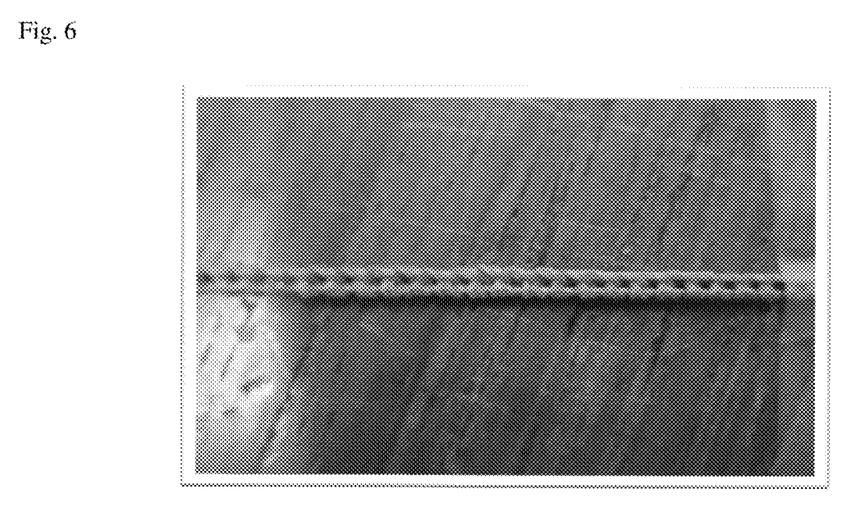
FIG. 6 is a photograph showing the structure of the upper thread and the lower thread of the second seam part sewed in the reverse direction, in the airbag cushion according to one embodiment of the present invention.

According to the direction of providing the upper thread 102, 'forward direction' and 'reverse direction' can be defined. At this time the 'forward direction' can be defined as the direction of providing the upper thread 202 and the direction of sewing the fabrics in which the upper thread 202 can be sewed without a twine against the lower thread 201, as shown in FIGS. 2, 3, and 5, and the 'reverse direction' can be defined as the direction of providing the upper thread 202 and the direction of sewing the fabrics in which the upper thread 202 is sewed with a twine against the lower thread 201, as shown in FIGS. 2, 4, and 6.

By the way, whether the upper thread 102 is twineed against the lower thread 100 or not varies according to the sewing directions, namely, to the 'forward direction' or the 'reverse direction', and thus the necessary length of the upper thread varies between each seam parts sewed in the 'forward direction' and the 'reverse direction', and the seam parts have a deviation in the connection performance.

As a result of the present inventors, it is revealed that the properties of the seam parts can be optimized by controlling the tension of the upper sewing thread to be an optimum range and maintaining the deviation of the necessary length of the sewing thread below a certain standard, and thus the air-seal property and the internal pressure maintenance can be largely improved.

Particularly, the present invention prevents the decrease of the mechanical properties when sewing in the reverse direction, and thus can secure superior mechanical properties for the first seam part sewed in the forward direction and the second seam part sewed in the reverse direction, and can obtain the effect of improving the unfolding performance of the airbag cushion according to this, at the same time.

According to one embodiment of the present invention, an airbag cushion including seam parts having a certain characteristic is provided. The airbag cushion may include at least one fabric, and seam parts connecting the fabric, and deviation of upper seam thread length per a unit length of the fabric between the first seam part sewed in forward direction and the second seam part sewed in reverse direction in the seam parts may be 15% or less.

The necessary length ($L_1$) of the sewing thread of the first seam part sewed in the forward direction per a unit length of the airbag cushion fabric and the necessary length ($L_2$) of the sewing thread of the second seam part sewed in the reverse direction may have a deviation ($\Delta L$) of 15% or less, or 1% to 15%, preferably 12% or less, or 1.5% to 12%, and more preferably 10% or less, or 2% to 10%. Particularly, the deviation ($\Delta L$) of the necessary lengths of the sewing threads between the first seam part and the second seam part may be represented by the following Calculation Formula 1:

$$\Delta L(\%) = \frac{|(L_2 - L_1)|}{L_1} \times 100 \qquad \text{[Calculation Formula 1]}$$

wherein, $L_1$ is the necessary length of the sewing thread per a unit length of the airbag cushion fabric in the first seam part sewed in the forward direction, and $L_2$ is the necessary length of the sewing thread per a unit length of the airbag cushion fabric in the first seam pa wed in the forward direction.

Here, the necessary length deviation ($\Delta L$) of the sewing thread between the first seam part and the second seam part can be represented as a percentage of the absolute value of the difference between the necessary length ($L_1$) of the sewing thread per a unit length of the fabric in the first seam part sewed in the forward direction and the necessary length ($L_2$) of the sewing thread per a unit length of the fabric in the second seam part sewed in the reverse direction, compared to the necessary length ($L_1$) of the sewing thread.

In determining the necessary length deviation ($\Delta L$) of the sewing thread between the first seam part and the second seam part in the airbag cushion, it is more preferable that the conditions such as, the kind, the thickness, the sewing method, the number of stitch, and so on of the sewing threads are equally applied to the first seam part sewed in the forward direction and the second seam part sewed in the reverse direction.

Furthermore, when the necessary length deviation ($\Delta L$) of the sewing thread between the first seam part sewed in the forward and the second seam part sewed in the reverse directions is larger than 15%, the mechanical properties of the second seam part sewed in the reverse direction is apparently decreased in comparison with the first seam part sewed in the forward direction, and the air-seal property and the internal pressure maintenance may be largely decreased due to the difference of the properties between the first seam part and the second seam part.

Therefore, according to the present invention, it is possible to optimize the properties of the airbag cushion by just controlling the necessary length of the sewing thread according to the sewing direction. Particularly, the airbag cushion of the present invention can secure superior mechanical properties similar to the forward seam part even in the reverse seam part by optimizing the necessary length deviation ($\Delta L$) of the sewing thread between the first and second seam parts sewed in the forward and reverse directions to be 15% or less, and it is also possible to obtain superior air-seal performance and air-tightness, and improved unfolding performance.

The seam parts of the present airbag cushion are connected by using a sewing thread including at least one selected from the group consisting of a nylon-based thread, a polyester-based thread, a polyolefin-based thread, and an aramid-based thread, and it is preferable to use a nylon 66 thread, a nylon 46 thread, Kevlar (aramid-based thread), and so on in the aspects of heat resistance and shrinkage property, and it is most preferable to use a nylon 66 thread.

The thickness, namely, the total fineness, of the sewing thread may be 210 to 1,890 denier, and preferably 420 to 1,260 denier. It is preferable in the aspect of strength that the thickness of the sewing thread is 210 denier or more, and it is also preferable in the aspect of tolerance (elasticity) that the thickness of the sewing thread is 1,890 denier or less. Particularly, the thickness of the sewing thread can be varied according to the kind of airbag cushion and the pressure of inflator. The denier is a unit indicating the thickness of a thread, for example, when the weight of a thread having the length of 9000 m is 1 g, the thickness of the thread is 1 denier.

The tensile strength of the sewing thread measured according to ASTM D 204-97 method may be 58 N or more, preferably 58 N to 110 N, and more preferably it may be 89 N to 110 N when the thickness is 1,260 denier, and 58 N to 80 N when the thickness is 840 denier. When the tensile strength of the sewing thread is lesser than the range, the seam parts may be ripped up during the preparation or the unfolding process of the airbag because the strength of the seam parts is too weak, and when the tensile strength is too large, the unfolding time or the shape of the airbag may become unusual during the unfolding process of the airbag because the strength of the seam parts is too large.

Furthermore, the seam parts of the present airbag cushion can be prepared by effective sewing methods according to the use of each part, and at least one sewing method selected from the group consisting of a single-lock, a double-lock, a single-chain, and a double-chain can be used.

The number of stitches of the seam parts may be controlled to be in an optimum range according to the use of each part or the sewing method, and the number of stitches may be 20 to 80 ea/100 mm, preferably 25 to 75 ea/100 mm, and more preferably 30 to 70 ea/10 mm. When the number of stitches is lesser than 20 ea/100 mm, the seam parts may be ripped up during the preparation or the unfolding process of the airbag because the strength of the seam part is too weak, and when the number of stitches is larger than 80 ea/100 mm, the fabric may be damaged or the unfolding time or the shape of the airbag may become unusual during the unfolding process of the airbag because the strength of the seam part is too large.

The seam strength of the seam parts of the airbag cushion measured according to ASTM D 1683 method may be 100 to 400 kgf/inch, preferably 130 to 350 kgf/inch, and more preferably 150 to 300 kgf/inch. Furthermore, the elongation of the seam parts measured according to ASTM D 1683 method may be 15% to 80%, preferably 20% to 70%, and more preferably 25% to 60%. It is preferable for securing the optimized strength of the seam parts and accomplishing effective internal pressure maintenance that the seam strength and the elongation of the seam parts of the airbag cushion of the present invention is maintained in above range.

Particularly, the seam strength of the second seam part which is sewed in the reverse direction according to the present invention may be 73% or more, or 73% to 120%, preferably 74% or more, or 74% to 110%, and more preferably 75% or more, or 75% to 100%, in comparison with the seam strength of the first seam part which is sewed in the forward direction. Furthermore, the elongation of the second seam part sewed in the reverse direction may be 168% or less, or 100% to 168%, preferably 165% or less, or 102% to 165%, and more preferably 160% or less, or 105% to 160%, in comparison with the elongation of the first seam part sewed in the forward direction. Like this, the airbag cushion of the present invention can secure superior mechanical properties similar to the forward seam part even in the reverse seam part by optimizing the ranges of the seam strength and the elongation of the second seam part sewed in the reverse direction and the first seam part sewed in the forward direction, and it is also possible to obtain superior air seal performance and air-tightness, and improved unfolding performance.

Furthermore, the maximum pressure of initial expansion (unfolding) of the airbag cushion of the present invention may be 100 kPa or more, preferably 105 KPa or more, and more preferably 110 KPa or more, when an internal pressure is measured after providing an instant pressure of 25 bar to the airbag cushion. When the airbag cushion of the present invention is installed in an airbag system for a car, it is possible to exhibit superior performances as a safety system through said superior internal pressure maintenance.

Figure 7:
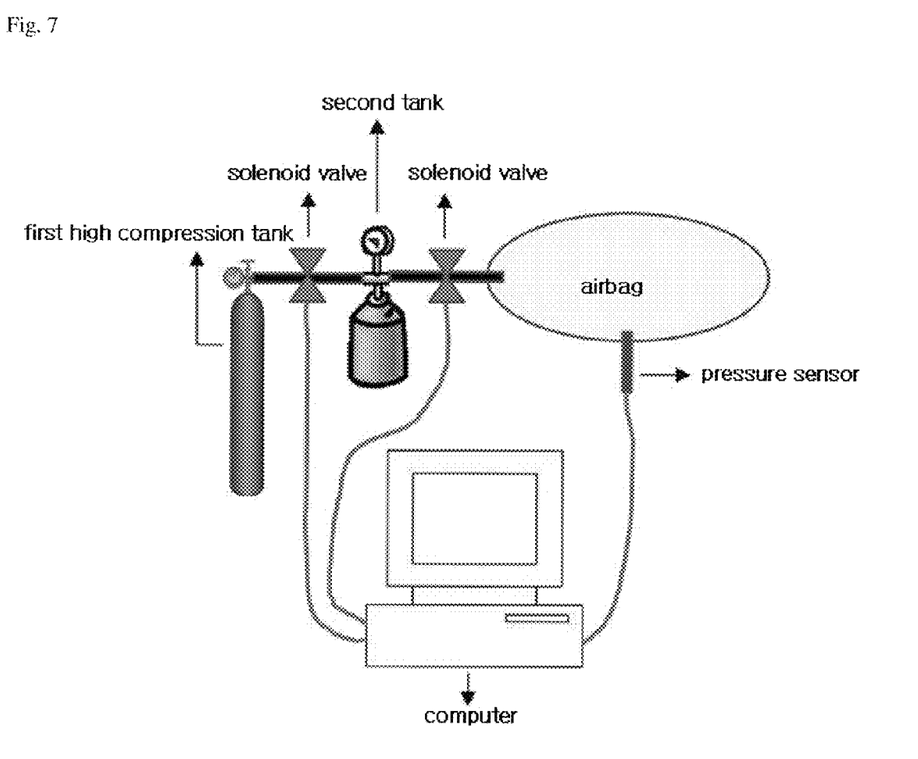
FIG. 7 is a schematic drawing showing the device for measuring the internal pressure of the airbag cushion according to one embodiment of the present invention.

In a preferable embodiment of the present invention, the internal pressure of the airbag cushion may be measured by using a device as shown in FIG. 7. In the measuring device, after charging the first high compression tank with nitrogen gas in a high-pressure, the first solenoid valve is opened and controlled by the computer so that nitrogen gas is charged in the second tank until 25 bar. When the second tank is charged up, the first solenoid valve is closed and the second solenoid valve is opened by the computer, and the compressed nitrogen gas charged in the second tank with the pressure of 25 bar discharges instantly into the airbag cushion which maintains an atmospheric pressure, and unfolds the airbag cushion. At this time, the initial maximum pressure inside of the airbag cushion is measured by the pressure sensor, and the results are recorded by the computer records.

Therefore, the airbag cushion of the present invention satisfies above conditions, and the initial maximum pressure thereof may be 100 KPa or more when the instant pressure of 25 bar is provided, the seam strength thereof may be 100 kgf/inch or more, and the elongation thereof may be 80% or less, preferably.

Meanwhile, the fabric of the airbag cushion of the present invention may be a woven fabric or a nonwoven fabric which is known as for the airbag cushion, and the kind is not limited particularly. For example, the woven fabric or the nonwoven fabric may include at least one thread selected from the group consisting of a nylon-based thread, a polyester-based thread, a polyolefin-based thread, and an aramid-based thread. Specifically, a woven fabric including nylon 66, poly(ethylene terephthalate) (PET), and/or polypropylene (PP) may be used, for example. The woven pattern of the woven fabric and the kind of the nonwoven fabric used in the present invention are also not limited particularly, however, it is preferable to use nylon 66 considering the strength of the seam parts, and the like.

The fabric is prepared into the airbag cushion fabric through conventional weaving, scouring, and heat-setting processes, and the fabric may be further treated by a silicon rubber coating and so on with a necessity. The coated airbag cushion fabric is prepared into an airbag cushion having a certain shape through cutting and sewing processes disclosed below. At this time, the airbag cushion is not limited to a particular shape, and it may be prepared into a general shape.

Particularly, the fabric may further include a rubber coating layer which is coated or laminated on one face or both faces of the fabric. The rubber material may be at least one selected from the group consisting of a powder-type silicone, a liquid-type silicone, polyurethane, chloroprene, neoprene rubber, and an emulsion-type silicone resin. The kind of the rubber material is not limited to above materials, however, a silicone coating is preferable in the aspects of eco-friendly properties and mechanical properties.

At this time, the quantity of the rubber coating layer per a unit area may be 20 to 200 $g/m^2$, and preferably 20 to 100 $g/m^2$. Particularly, the quantity is preferably 30 to 95 $g/m^2$ in the case of preparing an OPW (One Piece Woven)-type side curtain airbag, and preferably 20 to 50 $g/m^2$ in the case of using a plain-type fabric.

On the other hand, a method of preparing an airbag cushion, controlling tension of a upper sewing thread to be an optimum range is provided, according to another embodiment of the present invention. The method of preparing the airbag cushion includes the steps of: cutting at least one fabric; and sewing the fabrics so as to connect each other, and the sewing step may be controlled so that the tension of the upper seam thread when sewing in the reverse direction is 105% to 140%, preferably 107% to 135%, and more preferably 110% to 130%, compared to the tension of the upper seam thread when sewing in the forward direction.

At this time, in the case of that the tension of the sewing thread when sewing in the reverse direction is lesser than 105% compared to the tension when sewing in the forward direction, the mechanical properties of the second seam part sewed in the reverse direction may be decreased apparently, the air seal performance and the internal pressure maintenance may also deteriorate, and the unfolding performance may deteriorate apparently, accordingly. Furthermore, in the case of that the tension of the sewing thread when sewing in the reverse direction is larger than 140% compared to the tension when sewing in the forward direction, the thread may be broken during the sewing process and the whole process cannot be carried out smoothly, or the fabric may be damaged, or the unfolding time or the shape of the airbag may become unusual during the unfolding process of the airbag because the strength of the seam part is too large.

Furthermore, the sewing process may be carried out so that the deviation of the length of the upper seam thread per a unit length of the fabric between the first seam part sewed in the forward direction and the second seam part sewed in the reverse direction is 15% or less. Namely, the sewing process may be carried out so that the deviation ($\Delta L$) between the necessary length ($L_1$) of the sewing thread of the first seam part sewed in the forward direction per a unit length of the airbag cushion fabric and the necessary length ($L_2$) of the sewing thread of the second seam part sewed in the reverse direction is 15% or less, or 1% to 15%, preferably 12% or less, or 1.5% to 12%, and more preferably 10% or less, or 2% to 10%. Particularly, the necessary length deviation ($\Delta L$) of the sewing thread between the first seam part and the second seam part can be represented as a percentage of the absolute value of the difference between the necessary length ($L_1$) of the sewing thread per a unit length of the fabric in the first seam part sewed in the forward direction and the necessary length ($L_2$) of the sewing thread per a unit length of the fabric in the second seam part sewed in the reverse direction, compared to the necessary length ($L_1$) of the sewing thread, as disclosed above.

Therefore, according to another embodiment, the properties of the airbag cushion can be optimized by controlling the tension of the upper sewing thread in the optimum range according to the sewing directions. Particularly, the present method can secure superior mechanical properties similar to the forward seam part even in the reverse seam part by optimizing the tension so that the tension of the upper sewing thread when sewing in the reverse direction is 105% to 140% compared to the tension of the upper sewing thread when sewing in the forward direction, and it is also possible to obtain superior air-seal performance and air-tightness, and improved unfolding performance.

Furthermore, the sewing process can be selected from effective sewing methods according to the use of each part, and at least one sewing method selected from the group consisting of a single-lock, a double-lock, a single-chain, and a double-chain can be used.

The sewing process can be carried out by controlling the number of stitches to be in an optimum range according to the use of each part or the sewing method, and the number of stitches may be 20 to 80 ea/100 mm, preferably 25 to 75 ea/100 mm, and more preferably 30 to 70 ea/10 mm. When the number of stitches is lesser than 20 ea/100 mm, the seam parts may be ripped up during the preparation or the unfolding process of the airbag because the strength of the seam part is too weak, and when the number of stitches is larger than 80 ea/100 mm, the fabric may be damaged or the unfolding time or the shape of the airbag may become unusual during the unfolding process of the airbag because the strength of the seam part is too large.

Furthermore, the kind and the thickness (total fineness) of the sewing thread which can be used in the sewing process are same as disclosed above, and thus detailed explanations are skipped here.

In the method of preparing the airbag cushion of the present invention, any devices which can be used for preparing a sewed airbag may be used in the sewing process, and an industrial sewing machine of which head moves may be used in the aspect of process efficiency. Particularly, an additional tension control means may be used so as to control each tension of the sewing thread when sewing in the forward direction and in the reverse direction to be in an optimum range, and the means for controlling the tension of the sewing thread may be handled manually, or by a digital controller through a computer programming.

Furthermore, a sewing machine for an airbag cushion which can control and optimize the tension of the sewing thread in a certain range is provided according to still another embodiment of the present invention. The sewing machine may be equipped with a needle for sewing the fabrics, and a main thread controller providing a tension to an upper seam thread and a sub thread controller providing a preliminary tension to the upper seam thread provided to the main thread controller in the path of the upper seam thread from a thread supplying source to the needle; and may further include a control means for minutely controlling the preliminary tension according to the sub thread controller.

In the sewing machine for an airbag cushion, the preliminary tension according to the sub thread controller may be controlled so that the tension of the upper seam thread when sewing in the reverse direction is 105% to 140%, preferably 107% to 135%, and more preferably 110% to 130%, compared to the tension of upper seam thread when sewing in the forward direction. Furthermore, the tension of the upper sewing thread may be controlled so that the deviation of the length of the upper seam thread per a unit length of the fabric between the first seam part sewed in the forward direction and the second seam part sewed in the reverse direction is 15% or less, in the sewing machine.

Figure 8:
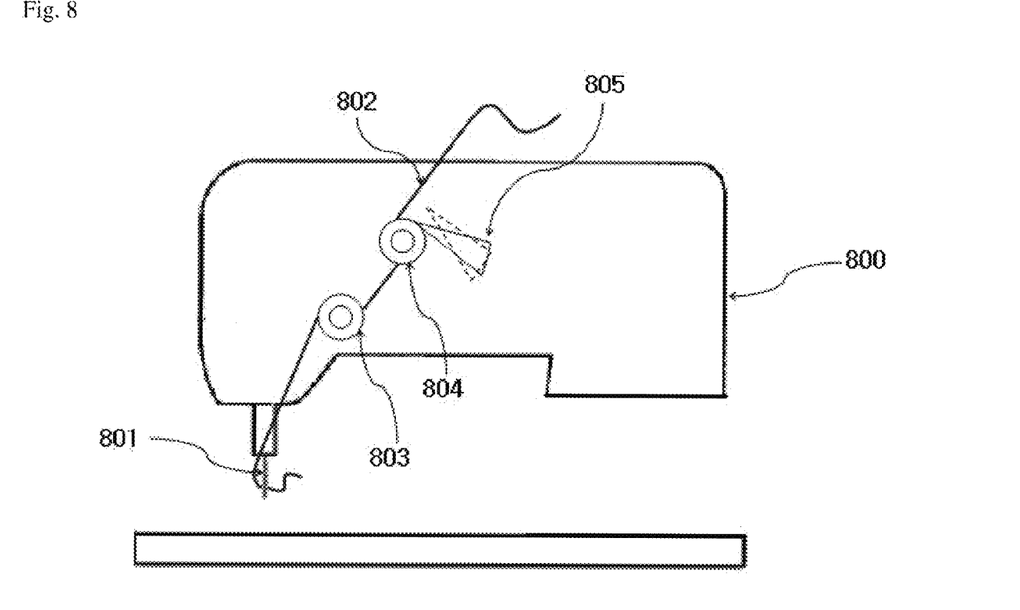
FIG. 8 is a schematic drawing showing the sewing machine for the airbag cushion according to one embodiment of the present invention.

In a preferable example, as shown in FIG. 8, the sewing machine 800 for the airbag cushion may be equipped with a needle 801 for sewing fabrics, and equipped with a main thread controller 803 providing a tension to an upper seam thread 802 and a sub thread controller 804 providing a preliminary tension to the upper seam thread introduced to the main thread controller in the path of the upper seam thread 802 from a thread supplying source to the needle 801, and may further include a control means 805 for minutely controlling the preliminary tension according to the sub thread controller 804.

The main thread controller 803 is equipped with a means for maintaining a certain tension while stably providing the upper sewing thread to the needle 801. The process of providing the tension by the main thread controller 803 may be carried out by manually giving a fixed value to the controller according to the kind of sewing thread, the number of stitches, the kind of fabric, and the like.

The sub thread controller 804 gives a preliminary tension to the main thread controller 803, and is equipped with a means for minutely controlling the tension controlled by the main thread controller 803. The process of providing the tension by the sub thread controller 804 may be carried out by manually giving a fixed value to the controller according to the kind of sewing thread, the number of stitches, the kind of fabric, and the like.

Furthermore, the control means 805 for minutely controlling the preliminary tension by the sub thread controller 804 is equipped with a means automatically controlling the tension difference between the seam parts according to the sewing direction by minutely controlling the tension which varies according to the sewing direction. The process of providing the tension by the control means 805 for minutely controlling the preliminary tension may be carried out by automatically controlling the upper sewing thread according to the sewing direction.

The control means 805 for minutely controlling the preliminary tension may be handled manually, or by a digital controller through a computer programming. Particularly, as shown in FIG. 8, the controller 805 for minutely controlling the preliminary tension may operate so as to lower the tension of the upper sewing thread when sewing in the forward direction (shown by a broken line), and to give the optimized tension of the upper sewing thread when sewing in the reverse direction (shown by a full line).

Like this, the sewing machine for the airbag cushion of the present invention is equipped with the control means for minutely controlling the preliminary tension in addition to the main thread controller and the sub thread controller, and makes it possible to control the tension automatically by minutely controlling the degree of tension continuously, without providing the tension of a fixed value to the sub thread controller.

In addition to, the present invention provides an airbag system including the airbag cushion disclosed above according to still another embodiment of the present invention. Particularly, the airbag system may include the airbag cushion to which the seam parts having a certain characteristics are applied, and the airbag system may be also equipped with common devices well known to a person skilled in the related art.

The airbag may be largely classified into a frontal airbag and a side airbag. There are airbags for a driver's seat, for a passenger seat, for protecting knees, for protecting ankles, and the like as the frontal airbag, and there are a side airbag of a car and a curtain airbag as the side airbag. Therefore, the airbag may be a frontal airbag, a side airbag, or a curtain airbag.

The matters that is not disclosed above may be added to or subtract from the present invention, and thus they are not limited particularly in the present invention.

According to the present invention, an airbag cushion having a superior working stability for the seam parts and unfolding performance of the airbag, and a method of preparing the same, a sewing machine which can be used for the method, and an airbag system including the same are provided.

Particularly, the present invention can improve the seam strength and the elongation of the seam parts so as to exhibit superior unfolding performance when the airbag is expanded, and can secure superior internal pressure maintenance by optimizing the properties of the seam parts of the airbag cushion. Furthermore, the airbag cushion of the present invention provides superior shape stability and air-seal effect, and can protect a passenger safely by minimizing the shock given to the passenger.

Therefore, the airbag cushion of the present invention can be very preferably used to the airbag system for a car.

Hereinafter, preferable examples and comparative examples are presented for understanding the present invention. However, the following examples are only for illustrating the present invention and the present invention is not limited to or by them.

Examples 1-5

Non-coated fabrics which were prepared according to the conditions disclosed in the following Table 1 and passed through a scouring process and a tentering process, or coated fabrics to which a knife over roll coating method was applied were used as the fabrics for airbag cushions. The fabrics were cut by using a laser cutter, and the sewing processes were carried out by using the sewing machine as shown in FIG. 8. The sewing processes were carried out according to the conditions disclosed in the following Table 1 so as to prepare the airbag cushions.

At this time, the kind of sewing thread, the sewing method, the number of stitches, the tension, the kind and the weaving type of fabrics, the coated material, and the coated quantity were as disclosed in the following Table 1. Here, the tensile strength of the sewing thread was measured according to ASTM D 206-97 method, and the necessary length of the upper sewing threads of the first seam part sewed in the forward direction and the second seam part sewed in the reverse direction was represented as the necessary length of the upper thread per a unit length (10 cm) of the fabric. Furthermore, the kind of sewing thread, the sewing method, the number of stitches, and the like were equally applied to the first seam part and the second seam part. Other conditions except above conditions followed common conditions for preparing the airbag cushion.

Comparative Examples 1-2

The airbag cushions of Comparative Examples 1-2 were prepared substantially according to the same method as in Examples 1-5, except that the conditions were varied as disclosed in the following Table 1. The measured properties are listed in the following Table 1.

The properties of the airbag cushions prepared according to Examples 1-5 and Comparative Examples 1-2 were measured according to the following methods, and the measured properties are listed in the following Table 1.

a) Seam Strength and Elongation

Seam strength and elongation of the first seam part sewed in the forward direction and the second seam part sewed in the reverse direction in the airbag cushions were measured.

At first, the specimen of the airbag cushion was fixed to a lower clamp of a measuring device, and the seam strength and the elongation when the specimen was broken were measured while moving an upper clamp upwardly, according to ASTM D 1683 method.

b) Measurement of Internal Pressure During the Airbag Cushion is Expanded

As shown in FIG. 7, change of internal pressure of the airbag cushion according to time was measured after unfolding process by instantly injecting compressed nitrogen gas of 25 bar therein, and the maximum internal pressure values during initial expansion of the airbag cushion are listed in the following Table 1. Specifically, injection and blocking of the gas were controlled by using an electronic control device, because it is preferable to minimize an error by controlling such actions electronically.

TABLE 1

| Classification | Example 1 | Example 2 | Example 3 | Example 4 | Example 5 | Comparative Example 1 | Comparative Exampl2 |
|---|---|---|---|---|---|---|---|
| Kind of Sewing Thread | Nylon 66 | Nylon 66 | Nylon 66 | Nylon 66 | Nylon 66 | Nylon 66 | Nylon 66 |
| Tensile Strength of Sewing Thread (N) | 100.9 | 107.8 | 100.9 | 100.9 | 107.8 | 100.9 | 107.8 |
| Total Fineness of Sewing Thread (de) | 1,260 | 1,260 | 1,260 | 1,260 | 1,260 | 1,260 | 1,260 |
| Sewing Method | Single-lock | Single-lock | Single-lock | Single-lock | Single-lock | Single-lock | Single-lock |
| Number of Stitches (ea/100 mm) | 65 | 65 | 65 | 65 | 65 | 65 | 65 |
| Tension of Reverse Seam Thread compared to Forward Seam Thread (%) | 110 | 125 | 130 | 135 | 140 | 100 | 145 |
| Kind of Fabric | Nylon 66 | Nylon 66 | Nylon 66 | Nylon 66 | Nylon 66 | Nylon 66 | Nylon 66 |
| Total Fineness of Fabric (de) | 420 | 420 | 420 | 420 | 420 | 420 | 420 |
| Weaving Density of Fabric | 49 × 49 | 49 × 49 | 49 × 49 | 49 × 49 | 49 × 49 | 49 × 49 | 49 × 49 |
| Weaving Pattern of Fabric (Plain/OPW) | Plain | Plain | Plain | Plain | Plain | Plain | Plain |
| Rubber Material | Silicone | Silicone | Silicone | Silicone | Silicone | Silicone | Silicone |
| Quantity of Rubber (g/m2) | 25 | 25 | 25 | 25 | 25 | 25 | 25 |
| Length of Upper Thread of First Seam Part (mm) | 329 | 324 | 326 | 328 | 327 | 330 | Cannot Sew |
| Length of Upper Thread of Second Seam Part (mm) | 344 | 335 | 346 | 360 | 369 | 390 | Cannot Sew |
| Deviation of Length of Upper Threads between First Seam Part and Second Seam Part (%) | 4.6 | 3.4 | 6.1 | 9.7 | 12.8 | 16.7 | Cannot Sew |
| Seam Strength of First Seam Part (kgf) | 233 | 231 | 234 | 236 | 237 | 238 | Cannot Sew |
| Seam Strength of Second Seam Part (kgf) | 219 | 221 | 209 | 189 | 179 | 170 | Cannot Sew |

TABLE 1-continued

| Classification | Example 1 | Example 2 | Example 3 | Example 4 | Example 5 | Comparative Example 1 | Comparative Exampl2 |
|---|---|---|---|---|---|---|---|
| Seam Strength of Second Seam Part compared to First Seam Part (%) | 94 | 96 | 89 | 80 | 76 | 71 | Cannot Sew |
| Elongation of First Seam Part (%) | 48 | 47 | 49 | 48 | 50 | 51 | Cannot Sew |
| Elongation of Second Seam Part (%) | 52 | 50 | 59 | 73 | 80 | 87 | Cannot Sew |
| Elongation of Second Seam Part compared to First Seam Part (%) | 108 | 106 | 120 | 152 | 160 | 171 | Cannot Sew |
| Maximum Internal Pressure During Expansion (kPa) | 125 | 126 | 119 | 112 | 103 | 97 | Cannot Sew |

Figure 9:
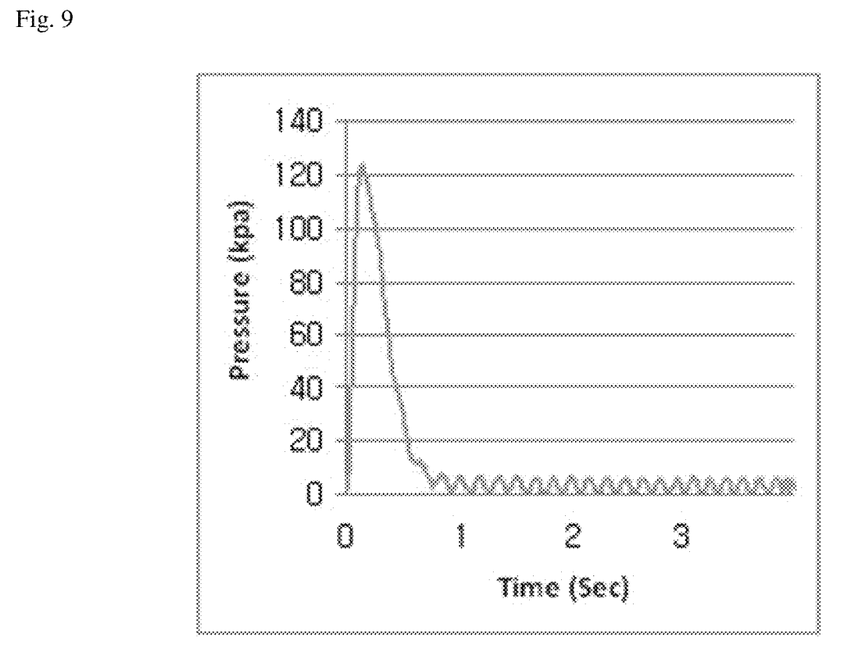
FIG. 9 is a graph showing the result of the internal pressure of the airbag cushion including the seam parts according to Example 1 of the present invention.
Figure 10:
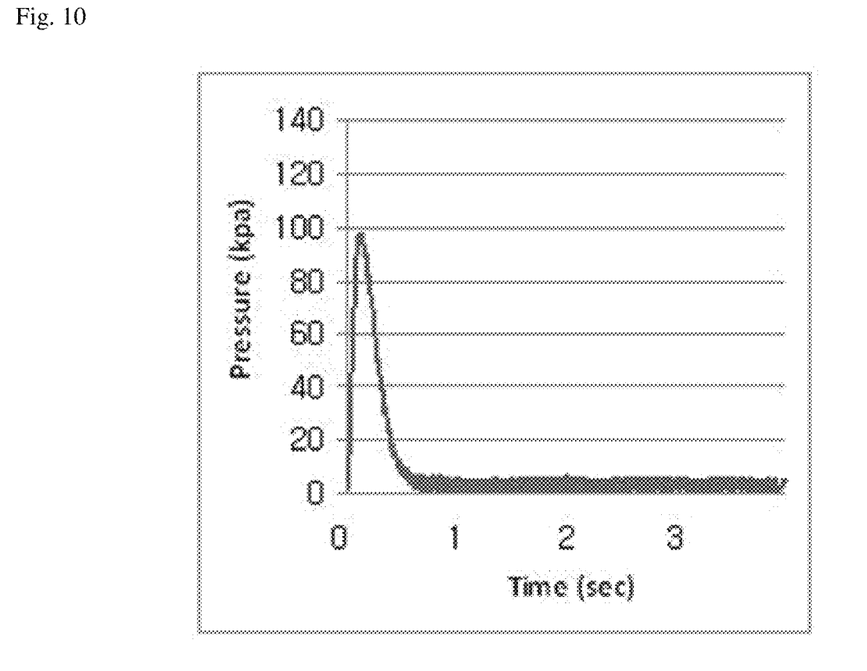
FIG. 10 is a graph showing the result of the internal pressure of the airbag cushion including the seam parts according to Comparative Example 1 of the present invention.

Furthermore, the graphs of the results of the internal pressure when expanding the airbag cushions of Example 1 and Comparative Example 1 are shown in FIGS. 9 and 10.

As shown in Table 1, in the cases of Examples 1-5 in which the properties of the seam parts are optimized by controlling each tension of the sewing thread in the forward direction and the reverse direction to be in an optimum range, it can be recognized that the seam parts of the airbag cushion have a uniform connection performance all over the airbag, and the airbag cushion have not only superior seam strength and elongation but also superior internal pressure maintenance of that the maximum internal pressure during initial expanding of the airbag cushion is 103 to 126 kPa. Particularly, since the airbag cushions prepared according to Examples 1-5 show that the seam strength and the elongation of the seam part sewed in the reverse direction are similar to (76% to 94%, and 108% to 160%, respectively, compared to) the seam strength and the elongation of the seam part sewed in the forward direction, it can be recognized that the airbag cushion have superior properties uniformly all over the airbag.

On the contrary, in the case of Comparative Example 1 in which the tension was equally applied to the forward sewing thread and the reverse sewing thread without optimizing the properties of the seam parts, it can be recognized that the seam strength and the elongation deteriorate apparently and it is impossible to provide a uniform and superior sewing connection performance all over the airbag. Particularly, it can be recognized that the elongation of the second seam part sewed in the reverse direction in the airbag prepared according to Comparative Example 1 reaches to about 87%, and the elongation of the second seam part is larger than about 170% compared to the elongation of the first seam part sewed in the forward direction. According to this, it can be also recognized that the seam strength of the second seam part sewed in the reverse direction in the airbag prepared according to Comparative Example 1 is just about 71% compared to the seam strength of the first seam part sewed in the forward direction, and thus the maximum pressure during initial expanding of the airbag cushion is apparently lowered to 97 kPa and overall properties and unfolding property of the airbag cushion are not good.

What is claimed:

1. A method of preparing an airbag cushion, including the steps of:
   cutting at least one fabric; and
   connecting the fabrics by sewing with seam parts comprising a first seam part and a second seam part,
   wherein the first seam part is sewed in a forward direction such that an upper thread is sewed without a twine against a lower thread, and the second seam part is sewed in a reverse direction such that the upper thread is sewed with a twine against the lower thread, and
   wherein the connecting step is controlled so that a tension of the upper seam thread with a twine when sewing in reverse direction is 105% to 140%, compared to a tension of the upper seam thread without a twine when sewing in forward direction.

2. The method according to claim 1, wherein the sewing process is carried out by at least on sewing method selected from the group consisting of a single-lock, a double-lock, a single-chain, and a double-chain.

3. The method according to claim 1, wherein the sewing process is controlled so that number of stitches of the seam parts is 20 to 80 ea/100 mm.

* * * * *